United States Patent
Fricke et al.

(10) Patent No.: US 8,226,389 B2
(45) Date of Patent: Jul. 24, 2012

(54) DEVICE FOR VULCANIZING VEHICLE TIRES USING A HEATING PRESS

(75) Inventors: Bernd Fricke, Sehnde (DE); Boris Primke, Neustadt (DE); Michael Ramm, Garbsen (DE); Rolf Hackbarth, Seelze (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 13/176,034

(22) Filed: Jul. 5, 2011

(65) Prior Publication Data

US 2011/0262572 A1    Oct. 27, 2011

Related U.S. Application Data

(63) Continuation of application No. PCT/EP2009/065710, filed on Nov. 24, 2009.

(30) Foreign Application Priority Data

Jan. 13, 2009 (DE) .................. 10 2009 003 342

(51) Int. Cl.
*B29C 35/04* (2006.01)

(52) U.S. Cl. .............. 425/29; 425/42; 425/170

(58) Field of Classification Search .......... 425/29, 425/42, 43, 143, 144, 170

See application file for complete search history.

(56) References Cited

U.S. PATENT DOCUMENTS

| 3,443,280 | A | * | 5/1969 | Hugger ................. 425/43 |
| 4,422,987 | A | * | 12/1983 | Arimatsu ............. 264/40.1 |
| 5,055,245 | A | | 10/1991 | Hisatomi et al. |
| 5,784,283 | A | * | 7/1998 | Rimondi et al. ....... 425/170 |
| 7,416,694 | B2 | * | 8/2008 | Okada et al. ........... 425/41 |
| 7,914,272 | B2 | | 3/2011 | Soccard |
| 2007/0029026 | A1 | | 2/2007 | Bolognese |

FOREIGN PATENT DOCUMENTS

| EP | 1415795 A2 | 5/2004 |
| EP | 1636025 A1 | 3/2006 |
| GB | 1273579 A | 5/1972 |
| JP | 1113211 A | 5/1989 |
| WO | 2006059051 A1 | 6/2006 |

OTHER PUBLICATIONS

International Search Report dated Feb. 26, 2010.

\* cited by examiner

*Primary Examiner* — James Mackey
(74) *Attorney, Agent, or Firm* — Laurence A. Greenberg; Werner H. Stemer; Ralph E. Locher

(57) ABSTRACT

A device for vulcanizing vehicle tires uses a heating press and an internal bladder that is supplied with vaporous heating medium. In order to assure that the measurement of the vulcanization temperature is effected at the relevant locations of the internal heater, there is provided a temperature sensor in the form of a radiation thermometer or pyrometer that is disposed in the bladder cavity. The pyrometer takes an indirect temperature measurement for at least one location on the interior wall of the bladder by measuring a radiant energy emitted from the interior of the bladder.

8 Claims, 1 Drawing Sheet

DEVICE FOR VULCANIZING VEHICLE TIRES USING A HEATING PRESS

CROSS-REFERENCE TO RELATED APPLICATION

This application is a continuation, under 35 U.S.C. §120, of copending international application No. PCT/EP2009/065710, filed Nov. 24, 2009, which designated the United States; this application also claims the priority, under 35 U.S.C. §119, of German patent application No. DE 10 2009 003 342.4, filed Jul. 13, 2009; the prior applications are herewith incorporated by reference in their entirety.

BACKGROUND OF THE INVENTION

Field of the Invention

The invention lies in the field of vehicle tires and pertains, more particularly, to a device for vulcanizing vehicle tires with a heating press.

The vulcanization of tires is performed in heating presses in which the tire blank is inserted into suitable mold segments and vulcanized under the effect of heat and pressure. A flexible bladder is placed against the tire on the inside thereof and subjected to a vaporous heating medium, by way of which the necessary vulcanizing energy is supplied to the tire blank from the inside. Supplying the vulcanizing energy via the inside of the tire is referred to in the pertinent art as internal heating. The required vulcanizing temperatures and vulcanizing time are dependent on a variety of parameters, for example on the type of tire.

It is usual to measure the temperature of the heating medium that is applied to the bladder. In the case of conventional heating presses, the temperature sensors are, for example, arranged in pipelines or on the central mechanism. A different configuration of the temperature sensor is disclosed by U.S. Pat. No. 5,055,245. There, the temperature sensor is arranged in the heating medium cavity directly over the opening of the supply line for the heating medium. A major disadvantage of that type of arrangement of the temperature sensor is that the temperature is measured at locations that are far away from the tire to be vulcanized. With this kind of temperature measurement, it is wrongly assumed that the temperature is homogeneously distributed at all locations in the heating medium and is constant. However, in the bladder or in the direct vicinity of the inside of the bladder, the temperature may deviate considerably from a location away from there.

SUMMARY OF THE INVENTION

It is accordingly an object of the invention to provide a device for vulcanizing vehicle tires which overcome the above-mentioned disadvantages of the heretofore-known devices and methods of this general type and with which the measurement of the vulcanizing temperature is carried out at the relevant locations of the internal heating.

With the foregoing and other objects in view there is provided, in accordance with the invention, a device for vulcanizing vehicle tires, comprising:

a heating press for a vehicle tire to be vulcanized;

a bladder disposed inside the vehicle tire to be vulcanized, the bladder being formed with a bladder cavity connected to receive therein a vaporous heating medium for heating the bladder and for transferring thermal energy required for vulcanizing the vehicle tire from said bladder cavity to the vehicle tire;

a radiation pyrometer disposed inside the bladder cavity, the radiation pyrometer being configured to indirectly measure a vulcanizing temperature by measuring a radiant energy emitted from one or more specific locations inside the bladder.

In other words, the objects of the invention are achieved by mounting in the bladder cavity a temperature sensor in the form of a radiation thermometer, with which an indirect temperature measurement is performed at at least one location on the inside of the bladder by way of a measurement of the radiant energy emitted by the inside of the bladder.

An advantage of the invention can be seen in particular in the fact that the temperature measurement by the temperature sensor according to the invention is carried out directly at the locations of the internal heating that are relevant for the vulcanizing of the tire and each tire is optimally vulcanized by way of the control processes performed on this basis.

The radiation pyrometer measures the temperature directly on the inner surface of the heating bladder. The temperature measurement is consequently performed directly at the relevant locations of the internal heating, at which the heat transfer to the vehicle tire to be vulcanized takes place. If there is a deviation from a setpoint temperature curve, the required temperature can be precisely corrected by means of a corresponding control algorithm. In this way, vehicle tires of a high product quality can be produced. A further advantage is that, with the precise temperature measurement at the relevant locations in the internal heating, improved process control is likewise possible, with the effect of saving energy or reducing the heating times.

In accordance with an added feature of the invention, the radiation pyrometer measures the temperatures at exactly predetermined positions on the inside of the bladder. The radiation pyrometer may be aligned in the bladder cavity in such a way that it measures the relevant temperatures on the bladder surface at precisely predetermined locations. In this way, the locations of the vehicle tire to be vulcanized that are critical in terms of heating and decisively influence the product quality of the vehicle tire can be monitored particularly.

In accordance with an additional feature of the invention, the radiation pyrometer measures the temperatures on the inside of the bladder, at the position on the inside of the bladder opposite where the tire shoulder of the vehicle tire to be vulcanized is lying against the bladder. The region in the tire shoulder is a location of the vehicle tire that is critical in terms of heating. In these regions, the measured actual temperature value should substantially match the predetermined setpoint temperature value in order for the vehicle tire to achieve high product quality.

In accordance with another feature of the invention, the radiation pyrometer is arranged in the bladder cavity on the central mechanism of the heating press. The arrangement of the radiation pyrometer on the central mechanism of the heating press can be implemented relatively easily in terms of the structural design. Furthermore, from this position, the radiation pyrometer can flexibly monitor various locations on the inside of the bladder surface that are critical in terms of heating.

In accordance with a further feature of the invention, the temperature measurements are performed at regular time intervals of about 5 to 15 seconds. A temperature measurement at these time intervals is sufficient on the one hand to keep the amount of data low and on the other hand to implement precise temperature control.

In accordance with again an added feature of the invention, a specific closed-loop control of the surface temperature of the bladder is performed with the temperature measurements. With the aid of the continuous temperature measurements at the locations directly on the bladder surface that are critical in terms of heating, it is then possible to implement an effective temperature control which takes into account the temperatures in the heating bladder that are actually relevant.

In accordance with an added feature of the invention, the closed-loop control is performed in dependence on a deviation from the setpoint temperature value by way of an adapted length of the blast of steam and/or adaptation of the steam pressure. The length of the blast of steam and the steam pressure represent suitable control parameters for implementing effective temperature control.

In accordance with a concomitant feature of the invention, the radiation pyrometer transmits the temperature data to a signal receiver via a wireless radio link. The wireless radio link facilitates the data exchange between the radiation pyrometer and the signal receiver, which is arranged outside the heating press.

Other features which are considered as characteristic for the invention are set forth in the appended claims.

Although the invention is illustrated and described herein as embodied in a device for vulcanizing vehicle tires using a heating press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
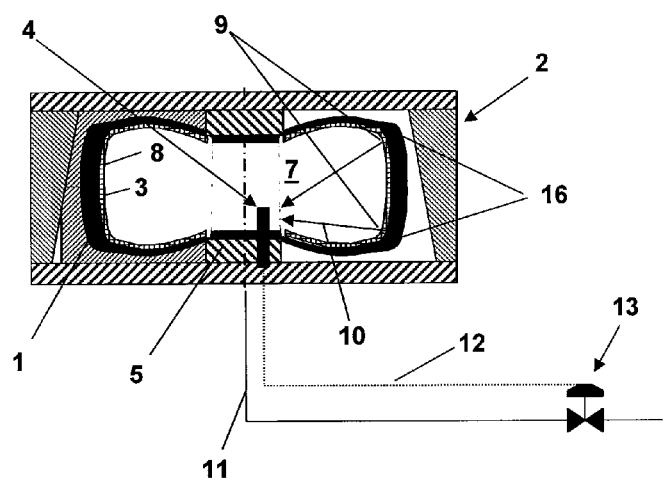
FIG. 1 is a schematic radial-sectional view of a device according to the invention with a temperature sensor arranged in the bladder.

Referring now to the figures of the drawing in detail and first, particularly, to FIG. 1 thereof, there is shown a device according to the invention for vulcanizing vehicle tires in a radial section. The tire 1 to be vulcanized is arranged in the heating press 2, which is operated with a heating medium in the vapor phase. The bladder 3, also referred to as a bellows, of the heating press 2 lies elastically against the surface of the inside of the tire and is connected to the heating press by means of fixing points that are not represented. The vaporous heating medium is supplied to the heating medium cavity or bladder cavity 7 via a supply line 11. The tire 1 to be vulcanized is supplied with the necessary vulcanizing temperature by heat exchange through the wall of the bladder 3.

The temperature sensor in the form of a radiation pyrometer 4 (also referred to as a radiation thermometer, spectral pyrometer, or, simply, pyrometer) is arranged in the bladder cavity 7 on the central mechanism 5 of the heating press 2. The radiation pyrometer 4 reaches into the bladder cavity in such a way that it can indirectly measure various temperatures on the inside 8 of the heating bladder 3. The radiation pyrometer is a temperature sensor which carries out an indirect temperature measurement through the vaporous medium in the bladder cavity. In this case, the radiant energy 10 emitted by the inside of the bladder is detected by the radiation pyrometer 4 and converted into a corresponding temperature value. The positions 9 on the inside of the bladder represent two locations that are critical in terms of heating, arranged opposite the tire shoulder of the tire 1. In the case of this exemplary embodiment, the individual sensors of the radiation pyrometer 4 are aligned such that a temperature measurement is carried out from these positions 9 on the bladder surface 8 that are critical in terms of heating. In this operation, the respectively emitted radiant energy 10 is measured and converted into a corresponding temperature value.

The radiation pyrometer 4 is connected via the connecting line 12 to an evaluation unit, which influences the control valve 13. The control valve 13 controls the vaporous medium pressure and time, here, the steam pressure and the length of the blast of steam. By means of these two control parameters, an effective temperature control of the internal heating is performed. If there is a deviation of the actual temperature value measured with the radiation pyrometer, a temperature control, i.e., a closed-loop control, is performed by means of a control algorithm. This temperature closed-loop control is performed, for example, by means of an adapted length of the blast of steam or an adapted steam pressure. The aim of the control is to bring the measured actual temperature value back again to match the predetermined setpoint temperature curve. The length of the blast of steam is the time during which the bladder cavity is subjected to the heating steam. An extended length of the blast of steam is generally concomitant with an extended heating time. An increase in the steam pressure is in direct connection with an increase in the temperature of the heating steam. The steam pressure consequently likewise has a direct influence on the vulcanizing energy that is supplied by way of the internal heating.

Figure 2:
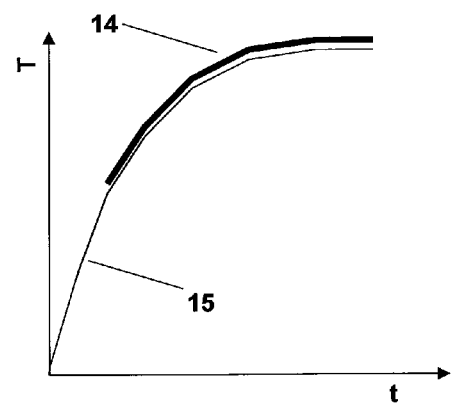
FIG. 2 is a temperature-time diagram.

Referring now to FIG. 2, there is shown a temperature-time diagram of the temperature control that can be carried out with the device according to the invention. Plotted on the X axis is the temperature T at a location on the bladder surface that is critical in terms of heating, for example at the position 9 in FIG. 1. Plotted on the Y axis of the diagram is the heating time t in seconds. The setpoint temperature curve 14 represents the ideal temperature curve that is required for an optimally heated vehicle tire. The actual temperature curve 15 represents the temperature values that are measured with the radiation pyrometer at the positions on the bladder surface that are critical in terms of heating. The actual temperature value is brought as close as possible to the setpoint temperature curve 14 by means of a corresponding closed-loop control algorithm. The control is performed by means of a corresponding adaptation of the controlled variables, here, the steam pressure and/or a correspondingly adapted length of the blast of steam. By way of this closed-loop control, vehicle tires of a particularly high product quality are produced.

The invention claimed is:

1. A device for vulcanizing vehicle tires, comprising:
a heating press for a vehicle tire to be vulcanized;
a bladder disposed inside the vehicle tire to be vulcanized, said bladder being formed with a bladder cavity connected to receive therein a vaporous heating medium for heating said bladder and for transferring thermal energy required for vulcanizing the vehicle tire from said bladder cavity to the vehicle tire;
a radiation pyrometer disposed inside said bladder cavity, said radiation pyrometer being configured to indirectly measure a vulcanizing temperature by measuring a radiant energy emitted from at least one specific location inside said bladder.

2. The device according to claim 1, wherein said radiation pyrometer is configured to measure temperature values at exactly predetermined positions on the inside of said bladder.

3. The device according to claim 1, wherein said radiation pyrometer is configured to measure temperature values on the inside of said bladder, at a position on the inside of said bladder opposite where a tire shoulder of the vehicle tire to be vulcanized lies against said bladder.

4. The device according to claim 1, wherein said radiation pyrometer is mounted in said bladder cavity on a central mechanism of said heating press.

5. The device according to claim 1, wherein said radiation pyrometer is driven to perform the indirect temperature measurements at regular time intervals of about 5 to 15 seconds.

6. The device according to claim 1, wherein the temperature measurements are integrated into a specific closed-loop control of a surface temperature of said bladder.

7. The device according to claim 6, wherein the closed-loop control is performed in dependence on a deviation from a setpoint temperature value by way of at least one of an adapted length of a blast of steam or an adaptation of a steam pressure injected into said bladder.

8. The device according to claim 1, wherein said radiation pyrometer is configured to transmit temperature data to a signal receiver via a wireless radio link.

* * * * *